(12) United States Patent
Dankberg (10) Patent No.: US 9,009,338 B2
(45) Date of Patent: Apr. 14, 2015

(54) SPACE SHIFTING OVER RETURN SATELLITE COMMUNICATION CHANNELS

(75) Inventor: Mark D. Dankberg, Encinitas, CA (US)

(73) Assignee: Viasat, Inc., Carlsbad, CA (US)

( * ) Notice: Subject to any disclaimer, the term of this patent is extended or adjusted under 35 U.S.C. 154(b) by 1221 days.

(21) Appl. No.: 12/716,190

(22) Filed: Mar. 2, 2010

(65) Prior Publication Data

US 2010/0228876 A1    Sep. 9, 2010

Related U.S. Application Data

(60) Provisional application No. 61/157,193, filed on Mar. 3, 2009.

(51) Int. Cl.
| | |
|---|---|
| *G06F 13/00* | (2006.01) |
| *H04B 7/185* | (2006.01) |
| *H04L 29/04* | (2006.01) |
| *H04L 29/02* | (2006.01) |

(52) U.S. Cl.
CPC ............ *H04B 7/18591* (2013.01); *H04L 29/04* (2013.01); *H04L 29/02* (2013.01)

(58) Field of Classification Search
CPC .... H04B 7/18591; H04L 29/02; H04L 29/04; H04L 2029/02
USPC ........ 709/231, 232, 238, 239; 725/63, 68, 71, 725/109, 110
See application file for complete search history.

(56) References Cited

U.S. PATENT DOCUMENTS

| | | | |
|---|---|---|---|
| 5,699,107 | A | 12/1997 | Lawler et al. |
| 5,815,146 | A | 9/1998 | Youden et al. |
| 6,240,555 | B1 | 5/2001 | Shoff et al. |
| 6,502,139 | B1 | 12/2002 | Birk et al. |

(Continued)

FOREIGN PATENT DOCUMENTS

| | | |
|---|---|---|
| WO | WO 2007/141555 A2 | 12/2007 |
| WO | 2008153310 | 12/2008 |

(Continued)

OTHER PUBLICATIONS

Walker et al., "Share it!—The Architecture of a Rights-Managed Network of Peer to-Peer Set-Top-Boxes." EUROCON 2003. IEEE Region 8; pp. 251-255.vol. 1.

(Continued)

*Primary Examiner* — Kenneth Coulter
(74) *Attorney, Agent, or Firm* — Marsh Fischmann & Breyfogle LLP; Daniel J. Sherwinter (57) ABSTRACT

A method for providing content from a first node to a second node using a satellite communications system includes receiving side information at a gateway in the satellite communications system. The side information may be transmitted from a subscriber terminal to the gateway via a first communication path that includes a satellite link. The method also includes determining at the gateway that the side information is associated with first content available at the first node, and determining at the gateway that second content is available from a source other than the first node. The method also includes generating output content using the second content and the side information. The output content may be substantially the same as the first content. The method also includes providing the output content to the second node via a second communication path that does not include the satellite link.

21 Claims, 10 Drawing Sheets

(56) References Cited

U.S. PATENT DOCUMENTS

| | | |
|---|---|---|
| 6,594,826 B1 | 7/2003 | Rao et al. |
| 6,622,305 B1 | 9/2003 | Birk |
| 6,931,512 B2 | 8/2005 | Dillon et al. |
| 6,973,667 B2 | 12/2005 | Fritsch |
| 7,000,245 B1 | 2/2006 | Pierre et al. |
| 7,003,791 B2 | 2/2006 | Mizutani |
| 7,024,156 B2 | 4/2006 | Kawamata et al. |
| 7,080,400 B1 | 7/2006 | Navar |
| 7,113,983 B1 | 9/2006 | Terada et al. |
| 7,404,201 B2 | 7/2008 | Takeuchi et al. |
| 8,078,696 B2 * | 12/2011 | LaJoie et al. ............. 709/219 |
| 8,181,206 B2 * | 5/2012 | Hasek ..................... 725/58 |
| 2002/0073225 A1 | 6/2002 | Dillon et al. |
| 2002/0154892 A1 | 10/2002 | Hoshen et al. |
| 2003/0149980 A1 | 8/2003 | Hassell et al. |
| 2003/0149988 A1 | 8/2003 | Ellis et al. |
| 2003/0204856 A1 | 10/2003 | Buxton |
| 2004/0073915 A1 | 4/2004 | Dureau |
| 2004/0255331 A1 | 12/2004 | Inoue et al. |
| 2005/0028208 A1 | 2/2005 | Ellis et al. |
| 2005/0204388 A1 | 9/2005 | Knudson et al. |
| 2005/0262542 A1 | 11/2005 | De Weese et al. |
| 2006/0031883 A1 | 2/2006 | Ellis et al. |
| 2007/0154169 A1 | 7/2007 | Cordray et al. |
| 2007/0157241 A1 | 7/2007 | Walker |
| 2007/0157266 A1 * | 7/2007 | Ellis et al. ............... 725/89 |
| 2007/0195815 A1 | 8/2007 | Turner et al. |
| 2007/0266414 A1 | 11/2007 | Kahn et al. |
| 2007/0276925 A1 * | 11/2007 | La Joie et al. ............. 709/219 |
| 2007/0276926 A1 * | 11/2007 | LaJoie et al. ............. 709/219 |
| 2007/0277199 A1 | 11/2007 | Yoon et al. |
| 2008/0034393 A1 | 2/2008 | Crayford |
| 2008/0134267 A1 | 6/2008 | Moghe et al. |
| 2008/0209491 A1 * | 8/2008 | Hasek ..................... 725/114 |
| 2008/0301746 A1 | 12/2008 | Wiser et al. |
| 2009/0158325 A1 | 6/2009 | Johnson |
| 2009/0165053 A1 | 6/2009 | Thyagarajan et al. |
| 2009/0198794 A1 | 8/2009 | Beals |
| 2009/0249413 A1 | 10/2009 | Karaoguz et al. |
| 2010/0131995 A1 | 5/2010 | Guo et al. |
| 2010/0153237 A1 * | 6/2010 | LaJoie et al. ............. 705/27 |
| 2010/0162367 A1 * | 6/2010 | LaJoie et al. ............. 726/4 |
| 2010/0223392 A1 | 9/2010 | Pond et al. |
| 2010/0229206 A1 | 9/2010 | Dankenberg |
| 2012/0033950 A1 | 2/2012 | Cordray |
| 2012/0157043 A1 * | 6/2012 | LaJoie et al. ............. 455/407 |

FOREIGN PATENT DOCUMENTS

| | | |
|---|---|---|
| WO | WO 2010/002761 A1 | 1/2010 |
| WO | WO 2010/102029 A2 | 9/2010 |

OTHER PUBLICATIONS

Chen et al., "Wormhole Caching with HTTP PUSH Method for a Satellite-Based Web Content Multicast and Replication System" NSDOCID, XP-002201410, 36 pages.

International Search Report for PCT Application No. PCT/US2010/026084 mailed on Oct. 8, 2010; 6 pages.

Written Opinion for PCT Application No. PCT/US2010/026084 mailed on Oct. 8, 2010; 7 pages.

* cited by examiner

SPACE SHIFTING OVER RETURN SATELLITE COMMUNICATION CHANNELS

CROSS-REFERENCES TO RELATED APPLICATIONS

The present application claims benefit of priority under 35 U.S.C. 119(e) of U.S. Provisional Application No. 61/157,193, filed Mar. 3, 2009, entitled "Source Coding and Space Shifting over Satellite Communication Channels," the content of which is incorporated herein by reference in its entirety.

The following U.S. nonprovisional patent applications, including the present application, are being filed concurrently, and the disclosure of the other application is incorporated by reference in the present application in its entirety for all purposes:

U.S. Nonprovisional patent application Ser. No. 12/716,190 filed Mar. 2, 2010 for "Space Shifting Over Return Satellite Communication Channels".

U.S. Nonprovisional patent application Ser. No. 12/716,186, filed Mar. 2, 2010, for "Space Shifting Over Forward Satellite Communication Channels".

FIELD OF THE INVENTION

The present invention relates generally to wireless communications. More particularly, the present invention relates to methods, apparatus, and systems for providing content using satellite communications systems.

BACKGROUND

Satellite communications systems are becoming ubiquitous for transmitting large amounts of content over large geographic regions. In typical satellite communications systems, end users interface with the system through subscriber terminals. The subscriber terminals communicate, via one or more satellites, with one or more gateways. The gateways may process and route data to and from one or more networks according to various network protocols.

With advances in technology, the demand for transmitting content continues to grow. End users desire increased flexibility and advanced features. As an example, an end user may desire to have a home satellite service, such as satellite television, available at another location while traveling. This may be referred to as space shifting. In one scenario, a satellite television program may be sent to a user's home and then from the home to an alternate location. Such a scenario can increase satellite channel utilization because the program is first sent to the user's home using one satellite link and then to the alternate location using another satellite link. Thus, improved methods and systems are desired that minimize satellite channel utilization while providing content using satellite communications systems.

SUMMARY

Embodiments of the present invention provide improved methods and systems for providing content in a satellite communications system by utilizing side information. Side information may be anything of use to the satellite communications system, including an identifier of content, a source identifier for content, credentials associated with accessing the content, type of encoding, parameters of encoding, encryption information, authentication, rights management, watermarking directions, timing, and the like. As an example, the side information may be used to identify content, such as audio or video media, that is being sent or is desired to be sent over a satellite link. Once the content has been identified, a source for the content may be found that does not require transmission over the satellite link. For example, a source for the content may be found on a network such as the Internet. The content may be obtained from the source on the network rather than sending the content over the satellite link. As another example, the content may be stored at a gateway or subscriber terminal of the satellite communications system. The content may be retrieved from the gateway or subscriber terminal rather than sending the content over the satellite link. Thus, satellite channel utilization can be minimized while providing content that is equivalent to or substantially the same as that which would have been provided had it been sent entirely over the satellite link.

In accordance with an embodiment of the invention, a method for providing content from a first node to a second node using a satellite communications system includes receiving side information at a gateway in the satellite communications system. The side information may be transmitted from a subscriber terminal to the gateway via a first communication path that includes a satellite link. The method also includes determining at the gateway that the side information is associated with first content available at the first node, and determining at the gateway that second content is available from a source other than the first node. The method also includes generating output content using the second content and the side information. The output content may be substantially the same as the first content. The method also includes providing the output content to the second node via a second communication path that does not include the satellite link.

In accordance with another embodiment of the invention, a gateway for providing content from a first node to a second node using a satellite communications system includes a receiving module configured to receive side information transmitted from a subscriber terminal via a first communication path that includes a satellite link. The gateway also includes a first determining module configured to determine that the side information is associated with first content available at the first node and a second determining module configured to determine that second content is available from a source other than the first node. The gateway also includes a generating module configured to generate output content using the second content and the side information. The output content may be substantially the same as the first content. The gateway also includes a providing module configured to provide the output content to the second node via a second communication path that does not include the satellite link.

In accordance with yet another embodiment of the invention, a satellite communications system for transmitting content from a first node to a second node includes a source encoder configured to receive first content from the first node and generate side information associated with the first content. The satellite communications system also includes a subscriber terminal configured to transmit the side information via a satellite link and a gateway configured to receive the side information via the satellite link. The gateway may be configured to determine that the side information is associated with the first content, determine that second content is available from a source other than the first node, generate output content using the second content and the side information, and provide the output content to the second node via a communication path that does not include the satellite link. The output content may be substantially the same as the first content.

Numerous benefits are achieved using the present invention over conventional techniques. For example, some embodiments according to the present invention provide methods for providing content in a satellite communications system while minimizing satellite channel utilization. Such embodiments can lower transmission costs and reduce transmission times. Depending upon the embodiment, one or more of these benefits may exist. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

The present invention provides methods, apparatus, and systems for providing content in a satellite communications system using side information. The side information may be used, for example, to identify content that is desired to be sent over a satellite link. Using the side information, the content may be found and obtained from a source that does not require transmission over the satellite link. As examples, the content may exist at a satellite gateway or subscriber terminal. Alternatively, the content may be available from a site that is accessible via a computer network. Obtaining the content from these sources, rather than via the satellite link, can minimize satellite channel utilization and reduce transmission times. These and other embodiments of the present invention are described more fully below.

Figure 1:
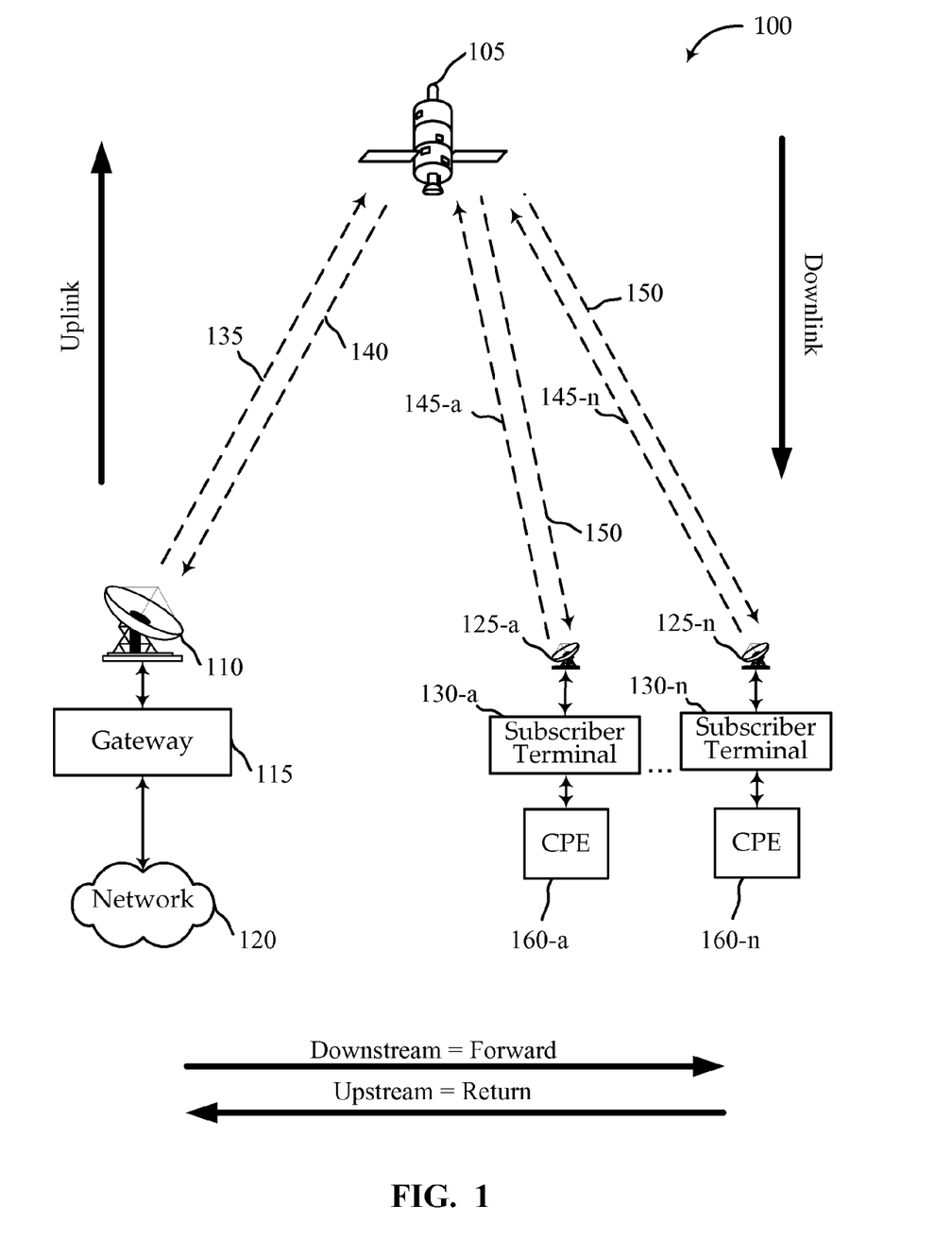
FIG. 1 is a simplified diagram of a exemplary satellite communications system.

FIG. 1 is a simplified diagram of an conventional satellite communications system 100. The satellite communications system 100 includes a network 120, such as the Internet, interfaced with a gateway 115. The gateway 115 is configured to communicate with one or more subscriber terminals 130 via a satellite 105. The gateway 115 is sometimes referred to as a hub or ground station. Subscriber terminals 130 are sometimes called modems, satellite modems, or user terminals. In accordance with embodiments of the present invention, the satellite communications system 100 may be any type of satellite communications system. For example, the satellite communications system 100 may be a geostationary satellite system or low earth orbit (LEO) satellite system.

The network 120 may be any type of network and can include, for example, the Internet, an IP network, an intranet, a wide-area network (WAN), a local-area network (LAN), a virtual private network (VPN), the Public Switched Telephone Network (PSTN), and/or any other type of network supporting data communications between devices. The network 120 may include both wired and wireless connections and/or optical links. Many other examples are possible and apparent to those skilled in the art in light of this disclosure. The network 120 may connect the gateway 115 with other gateways (not pictured), which may also be in communication with the satellite 105 and that may share information on link conditions and other network metrics.

The gateway 115 provides an interface between the network 120 and the satellite 105. The gateway 115 may be configured to receive data and information directed to one or more subscriber terminals 130. The gateway 115 may be configured to format the data and information along with control signals (e.g., using Adaptive Coding and Modulation (ACM) or Variable Coding and Modulation (VCM)) for delivery via the satellite 105 to the respective subscriber terminal 130. Multi-beam satellites may also be used with ACM or VCM. According to the message type and the link condition, ACM or VCM transmitters may utilize codes of various rates and sizes as well as modulations of different orders. For example, high rate codes and high order modulations may be used to take advantage of favorable channel conditions, while low rate codes and low order modulations may be used to ensure error free transmission when channel conditions degrade. Formatting data, information, and control signals may also include spreading techniques resulting in Adaptive Coding, Spreading and Modulation (ACSM).

Similarly, the gateway 115 may also be configured to receive signals from the satellite 105 (e.g., from one or more subscriber terminals 130) that are directed to a destination in the network 120. The gateway 115 may be configured to format the received signals for transmission through the network 120.

A device (not shown) connected to the network 120 may, therefore, communicate with one or more subscriber terminals 130 through the gateway 115. Data and information, for example IP datagrams, may be sent from the device to the gateway 115. The gateway 115 may format a Medium Access Control (MAC) frame in accordance with a physical layer definition for transmission of the data and information to the satellite 105. A variety of physical layer transmission modulation and coding techniques may be used with certain embodiments of the present invention, including those defined by the DVB-S2 and WiMAX standards. As illustrated in FIG. 1, the link 135 from the gateway 115 to the satellite 105 may be referred to as the downstream uplink 135.

The gateway 115 may use an antenna 110 to transmit signals to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite is configured to receive signals from the location of the antenna 110 and within the frequency band and specific polarization transmitted. The satellite 105 may use, for example, a reflector antenna, a lens antenna, an array antenna, an active antenna, or any other mechanism known in the art for reception of such signals. The satellite 105 may process the signals received from the gateway 115 and forward the signals containing the MAC to one or more of the subscriber terminals 130. In one embodiment, the satellite 105 operates in a multi-beam mode, transmitting a number of narrow beams each directed at a different region of the earth. This can allow frequency re-use. With such a multi-beam satellite, there may be any number of different signal switching configurations, allowing signals from a single gateway 115 to be switched between different spot beams. In one embodiment, the satellite 105 may be configured as a "bent pipe" satellite, wherein the satellite may frequency convert the received carrier signals before transmitting the signals to their destination but otherwise perform little or no processing on the contents of the signals. A variety of physical layer transmission modulation and coding techniques may be used by the satellite 105 in accordance with certain embodiments of the invention, including those defined by the DVB-S2 and WiMAX standards. For other embodiments, a number of configurations are possible (e.g., using LEO satellites or using a mesh network instead of a star network), as evident to those skilled in the art.

The signals transmitted from the satellite 105 may be received by one or more subscriber terminals 130 via a respective subscriber antenna 125. In one embodiment, an antenna 125 and a subscriber terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminals 130 to receive signals from the satellite 105. As shown in FIG. 1, the link 150 from the satellite 105 to the subscriber terminals 130 may be referred to as the downstream downlink 150. Each of the subscriber terminals 130 may comprise a single user terminal or, alternatively, a hub or router that may be coupled to multiple user terminals. Each subscriber terminal 130 may be connected to consumer premises equipment (CPE) 160 comprising, for example, computers, local area networks, Internet appliances, wireless networks, and the like.

In one embodiment, a Multi-Frequency Time-Division Multiple Access (MF-TDMA) scheme is used for upstream links 140, 145. This can allow efficient streaming of traffic while maintaining flexibility in allocating capacity among each of the subscriber terminals 130. In this embodiment, a number of frequency channels may be allocated in a fixed or dynamic fashion. A Time Division Multiple Access (TDMA) scheme may be employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes as evident to those skilled in the art.

A subscriber terminal, for example subscriber terminal 130-a, may transmit data and information to a destination in the network 120 via the satellite 105. The subscriber terminal 130-a transmits the signals via the upstream uplink 145-a to the satellite 105 using an antenna 125-a. The subscriber terminal 130-a may transmit the signals according to a variety of physical layer transmission modulation and coding techniques, including those defined by the DVB-S2 and WiMAX standards. In various embodiments, the physical layer techniques may be the same or different for each of the links 135, 140, 145, 150. As shown in FIG. 1, the link 140 from the satellite 105 to the gateway 115 may be referred to as the upstream downlink 140.

Figure 2:
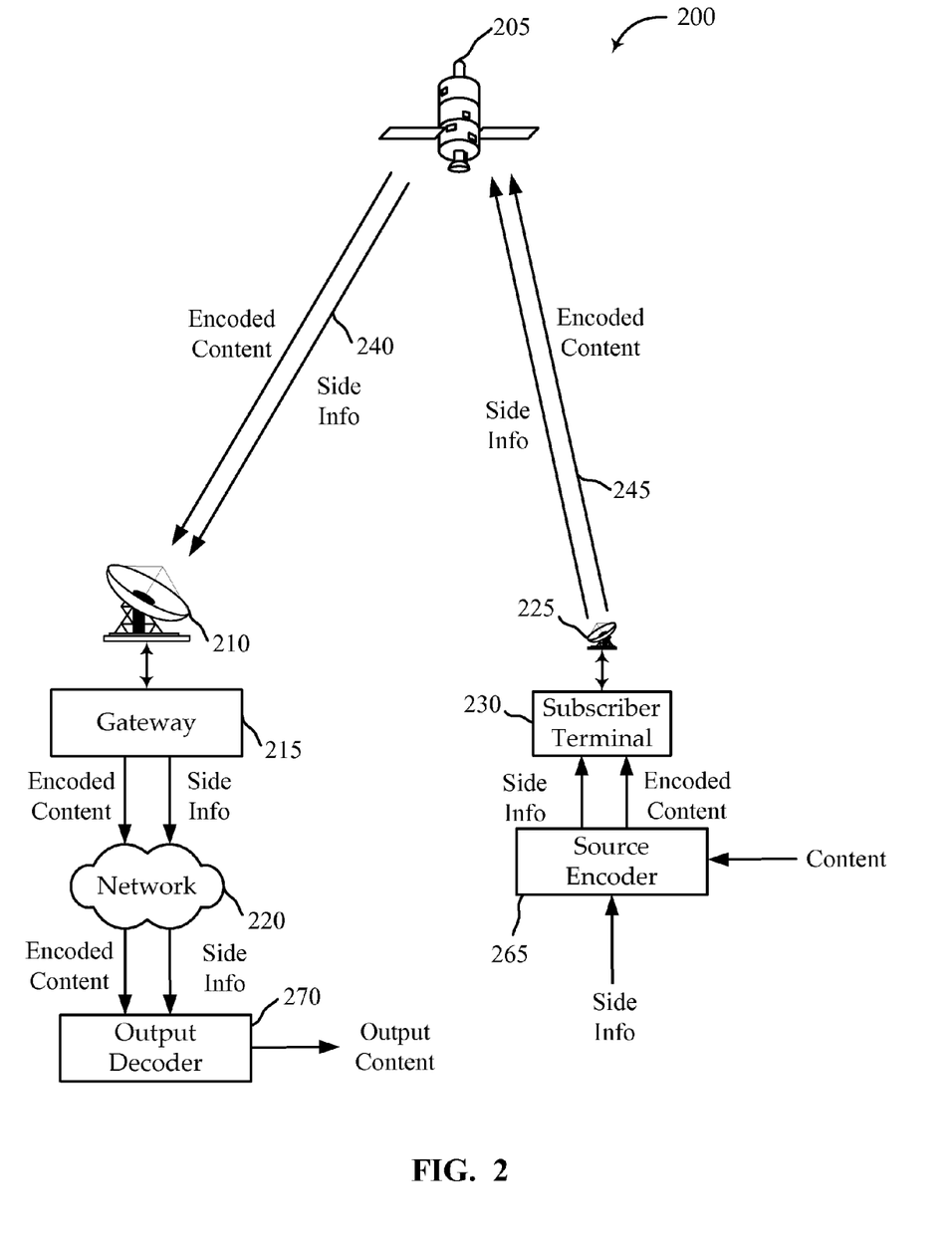
FIG. 2 is a simplified diagram of a satellite communications system configured in accordance with an embodiment of the present invention.

FIG. 2 is a simplified diagram of a satellite communications system 200 configured in accordance with an embodiment of the present invention. In this example, content, such as audio, video, and the like, may be transmitted from one location to another location via the satellite communications system 200. The content may be encoded by a source encoder 265 to provide encoded content to the subscriber terminal 230. The source encoder 265 may be part of the subscriber terminal 230 or it may be an independent device. The content may be in analog or digital form, and the encoding step may optionally include transcoding from one coding type to another. Forward error correction coding may be inserted at this stage (e.g., it can be integrated with the source encoding), or it may be inserted later in the transmission path.

Side information may also be encoded by the source encoder 265. Alternatively, the side information may be output from the source encoder 265 in an uncoded form. The side information may be anything of use to the satellite communications system 200, such as an identifier of the content, a source identifier for the content, credentials associated with accessing the content, type of encoding, parameters of encoding, encryption information, authentication, rights management, watermarking directions, timing information, and the like. In some embodiments, the side information may be used in transmitting and/or decoding the encoded content. The side information may be generated by the source encoder 265 or provided to the source encoder 265 by another device (not shown) within the satellite communications system 200. The side information output from the source encoder 265 may be the original side information, some representation of the original side information, and/or internally generated side information.

The encoded content and the side information that are output from the source encoder 265 are modulated by the subscriber terminal 230 and transmitted over satellite links 240, 245 to a gateway 215. Although represented by two separate signals in this figure, both types of data (i.e., the encoded content and the side information) may be multiplexed onto a single signal for transmission. Note that any bi-directional control and status messages necessary to support such communication are not shown for clarity.

As illustrated in this example, the gateway 215 may send the encoded content and the side information to an output decoder 270 using a network 220. The output decoder 270 may use the side information and the encoded content to create output content that is provided directly to an end user. Alternatively, the gateway 215 may send the encoded content and the side information to an end user via another subscriber terminal (not shown) using other satellite links, where the side information and the encoded content are used to create the output content for an end user. One of ordinary skill in the art would recognize many variations, modifications, and alternatives.

Figure 3:
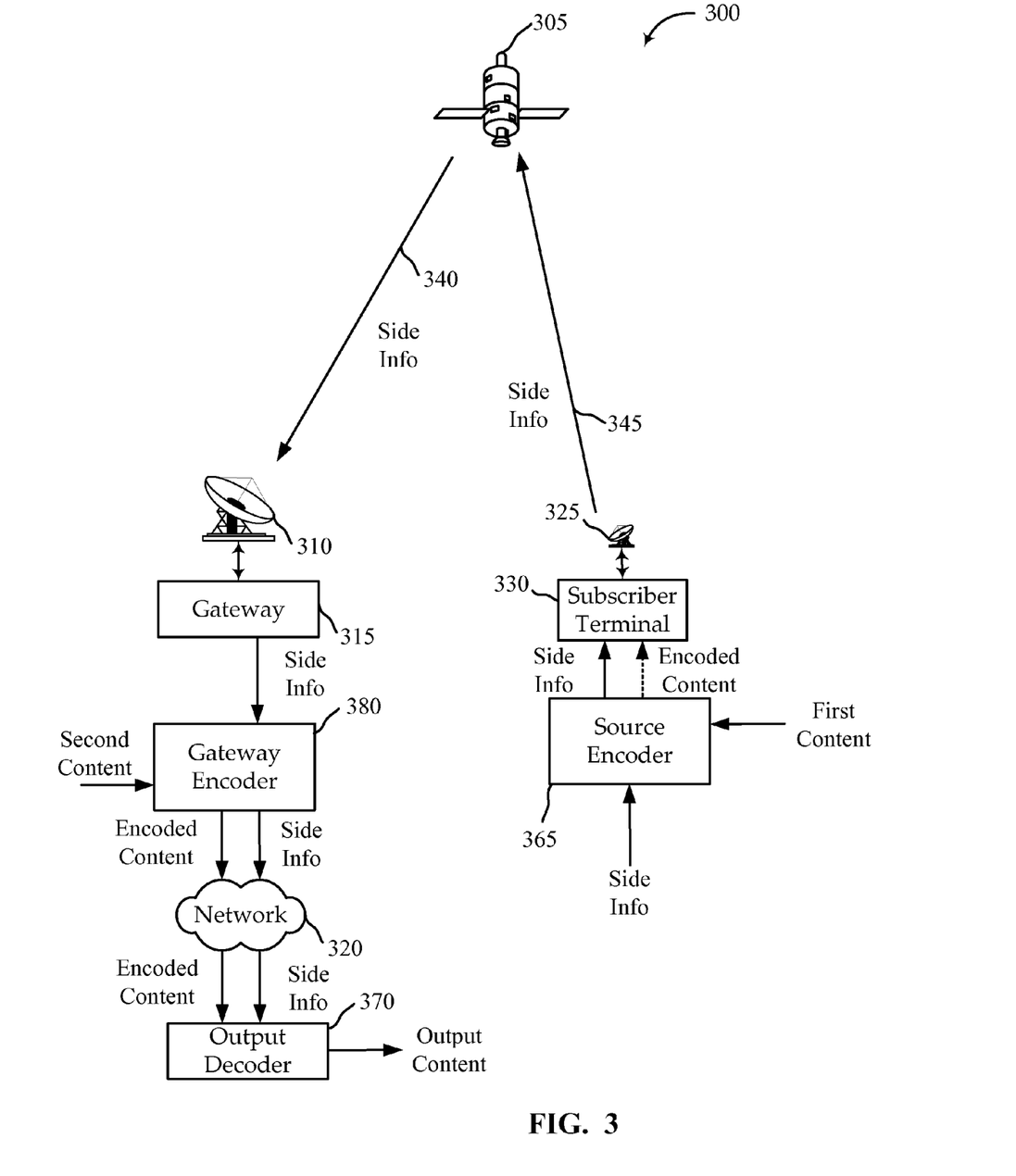
FIG. 3 is a simplified diagram of a satellite communications system configured for return channel optimization in accordance with an embodiment of the present invention.

FIG. 3 is a simplified diagram of a satellite communications system 300 configured for return channel optimization in accordance with an embodiment of the present invention. In this example, first content is encoded by source encoder 365 to provide encoded content. Side information may also be encoded by the source encoder 365. In this example, only the side information is modulated by subscriber terminal 330 and transmitted over satellite links 340, 345 to a gateway 315. The gateway 315 provides the side information to a gateway encoder 380 that may be part of the gateway 315 or an independent device. In this example, the gateway encoder 380 has access to second content from a source other than the subscriber terminal 330. For example, the second content may be stored at the gateway 315 or the gateway encoder 380. Alternatively, the second content may be available from a source that is accessible via a network 320. In some embodiments, the second content may be a similar version to or a copy of the first content. The second content may be in coded or uncoded form.

As illustrated in FIG. 3, the gateway encoder 380 may use the side information and the second content to provide encoded content to an output decoder 370 via the network 320. The output decoder 370 may use the side information and the encoded content to create output content that is provided directly to an end user. Alternatively, the gateway 315 may send the encoded content and the side information to an end user via another subscriber terminal (not shown) using other satellite links, where the side information and the encoded content are used to create the output content for an end user. In either scenario, output content is provided to the end user that is equivalent to or substantially the same as that which would have been provided had the encoded content been transmitted over the satellite links 340, 345.

Figure 4:
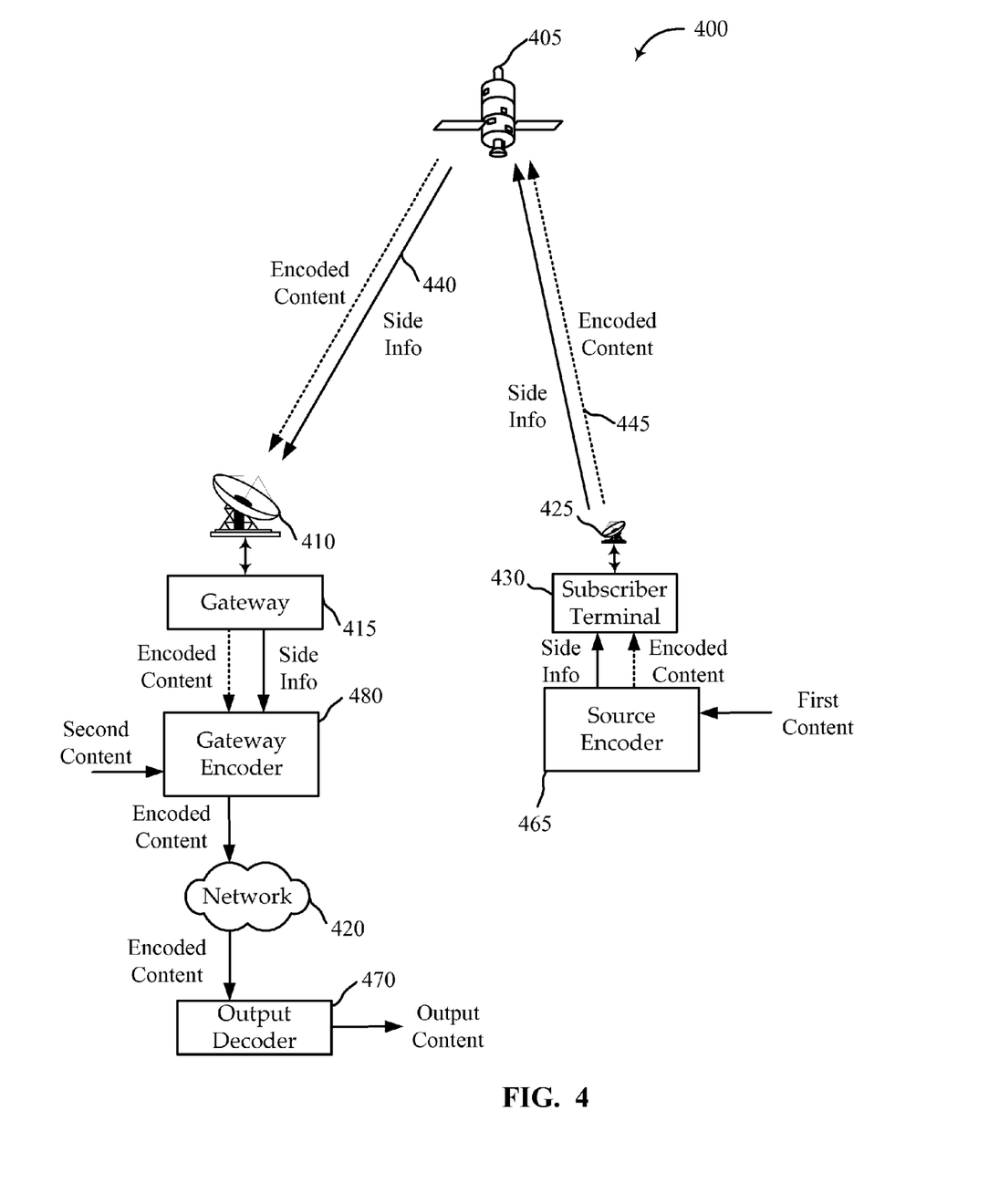
FIG. 4 is a simplified diagram of a satellite communications system configured for return channel optimization in accordance with another embodiment of the present invention.

FIG. 4 is a simplified diagram of a satellite communications system 400 configured for return channel optimization in accordance with another embodiment of the present invention. In this example, encoded content and side information are provided from a source encoder 465 to a subscriber terminal 430. The encoded content may be partially transmitted over satellite links 440, 445 (indicated by the dashed lines in FIG. 4). For example, the subscriber terminal 430 may start transmitting the complete stream including the encoded content and the side information to a gateway 415. The encoded content may be, for example, streaming media or downloadable content. The gateway 415 and/or a gateway encoder 480 may perform an analysis of the encoded content and/or the side information and determine that the encoded content can be obtained without transmitting the entire encoded content over the satellite links 440, 445. For example, the encoded content may be generated using second content stored at the gateway 415 or the gateway encoder 480. The second content may have been stored at the gateway 415 or the gateway encoder 480 during a previous broadcast or transmission. The gateway 415 may direct the subscriber terminal 430 to limit its broadcast to that portion of the side information that is necessary for the gateway encoder 480 to create the encoded content. In one embodiment, the encoded content may be provided to an output decoder 470 via a network 420. The output decoder 470 may decode the encoded content and provide output content directly to an end user. Alternatively, the gateway 415 may send the encoded content to an end user via another subscriber terminal (not shown) using other satellite links, where the encoded content is decoded to provide output content to an end user. Thus, return channel utilization can be minimized while the output content provided to the end user is equivalent to or substantially the same as that which would have been generated had the entire encoded content been transmitted over the satellite links 440, 445.

FIG. 4 shows the side information being generated at the source encoder 465. Alternatively, the side information may be provided to the source encoder 465 by another device, either before or after source encoding. FIG. 4 also shows that only the encoded content is output from the gateway encoder 480. In some embodiments, however, both the encoded content and the side information may be output from the gateway encoder 480.

Figure 5:
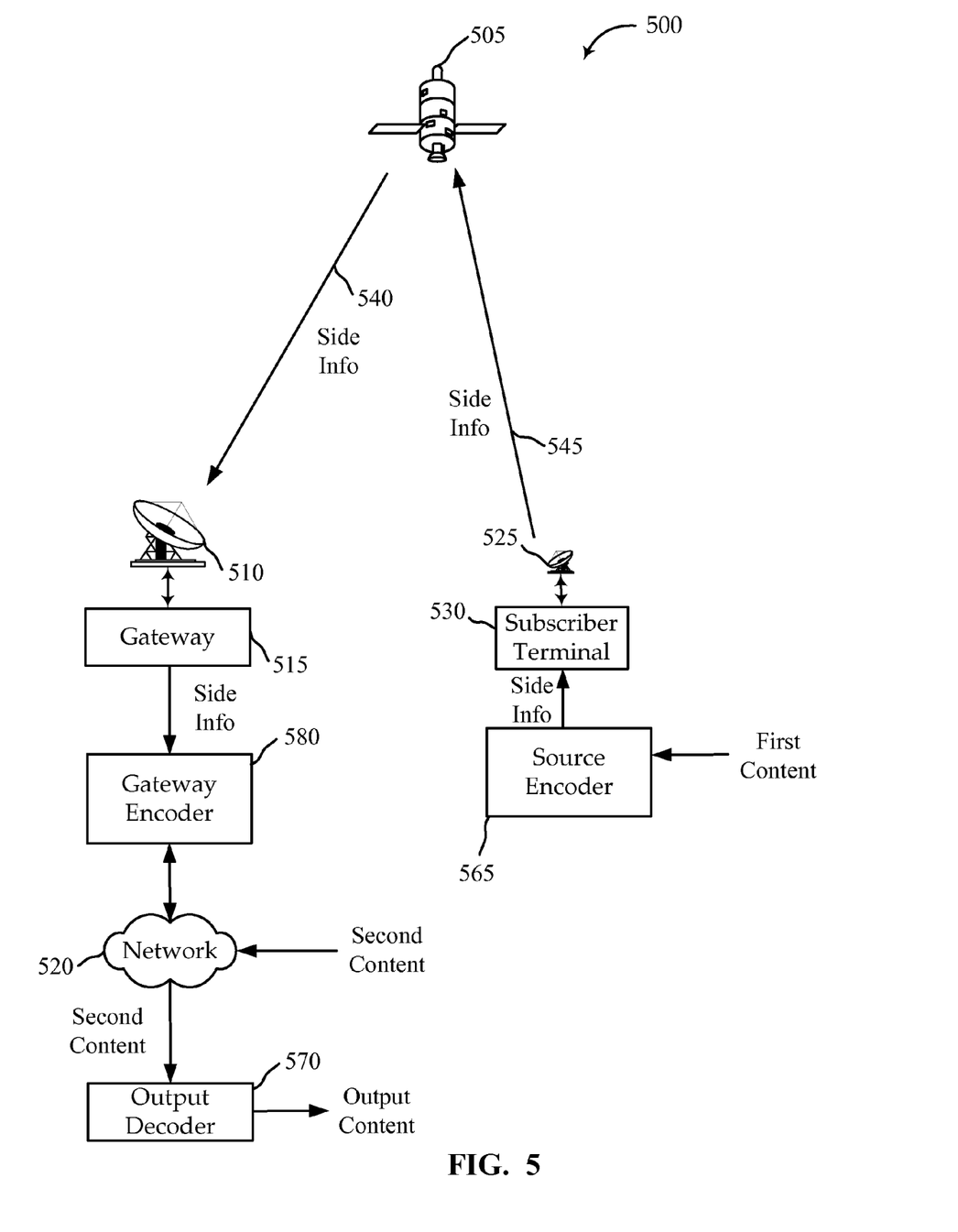
FIG. 5 is a simplified diagram of a satellite communications system configured for return channel optimization in accordance with another embodiment of the present invention.

FIG. 5 is a simplified diagram of a satellite communications system 500 configured for return channel optimization in accordance with another embodiment of the present invention. In this example, first content is provided to source encoder 565, and side information is generated based on the first content and provided to a subscriber terminal 530. The subscriber terminal 530 transmits the side information over satellite links 540, 545 to a gateway 515. In this example, the side information is used by the gateway 515 and/or a gateway encoder 580 to identify second content at another source that is accessible via a network 520. The gateway 515 or the gateway encoder 580 may have the second content sent directly to the output decoder 570 to provide output content to an end user. Alternatively, the second content may be obtained by the gateway 515 and/or the gateway encoder 580 and sent to the output decoder 570. As would be appreciated by one of ordinary skill in the art, the second content may be available in coded or uncoded form, and thus the gateway encoder 580 may encode or transcode the second content as necessary. In some embodiments, rather than providing the second content to the output decoder 570, the gateway 415 may send the second content to an end user via another subscriber terminal (not shown) using other satellite links. Thus, return channel utilization can be minimized while the output content provided to the end user is equivalent to or substantially the same as that which would have been generated had the entire encoded content been transmitted over the satellite links 540, 545. One of ordinary skill in the art would recognize many variations, modifications, and alternatives.

Figure 6:
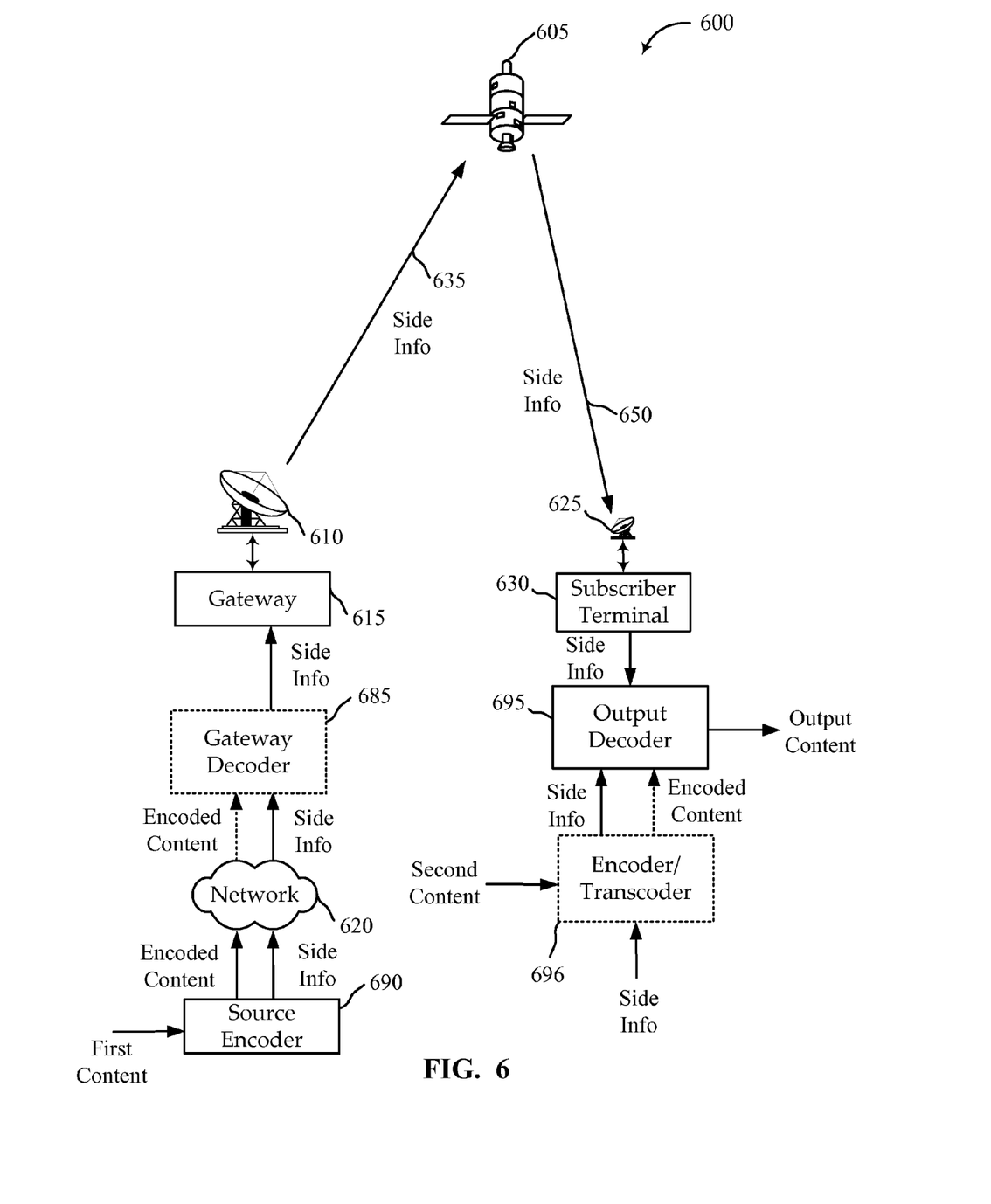
FIG. 6 is a simplified diagram of a satellite communications system configured for forward channel optimization in accordance with an embodiment of the present invention.

Similar methods can be used to optimize a forward satellite channel in accordance with various embodiments of the present invention. Such embodiments may be used independent of or in conjunction with the embodiments described above. FIG. 6 is a simplified diagram of one example of such a system. In this example, encoded content and side information may be generated from first content that is provided to a source encoder 690, and the side information may be provided to a gateway 615 via a network 620. Alternatively, the encoded content may be provided to a gateway decoder 685 via the network 620, and side information may be generated at the gateway decoder 685. The gateway decoder 685 may also be used for transcoding. For example, if the first content is a high-quality live video feed of the bicycle Race Across America (RAAM), and an end user has subscribed to a low quality webcast feed, then transcoding may be performed at the gateway decoder 685 to generate the side information necessary to provide a low-resolution representation of the video feed. The side information, either from the source encoder 690 or the gateway decoder 685, may be transmitted over satellite links 635, 650 to a subscriber terminal 630.

At the subscriber terminal 630, some alternate representation of the original first content, for example a similar version or a copy of the first content, may be available. The second content may be available via the same communications system provider as the first content or via another provider such as a broadcaster. Continuing with the above example, the RAAM video feed may be available to an end user through a satellite television broadcast system. The side information, which in this case may include at least an indication of the subscribed quality of the video feed, is provided to an output decoder 695. The output decoder 695 may use the side information to generate the output content for the end user. Alternatively, an encoder/transcoder 696 may be used if the second content is in a format that is different from that used by the output decoder 695. Thus, the output content provided to the end user may be equivalent to or substantially the same as that which would have resulted from the transmission of the entire encoded content over the satellite links 635, 650.

Figure 7:
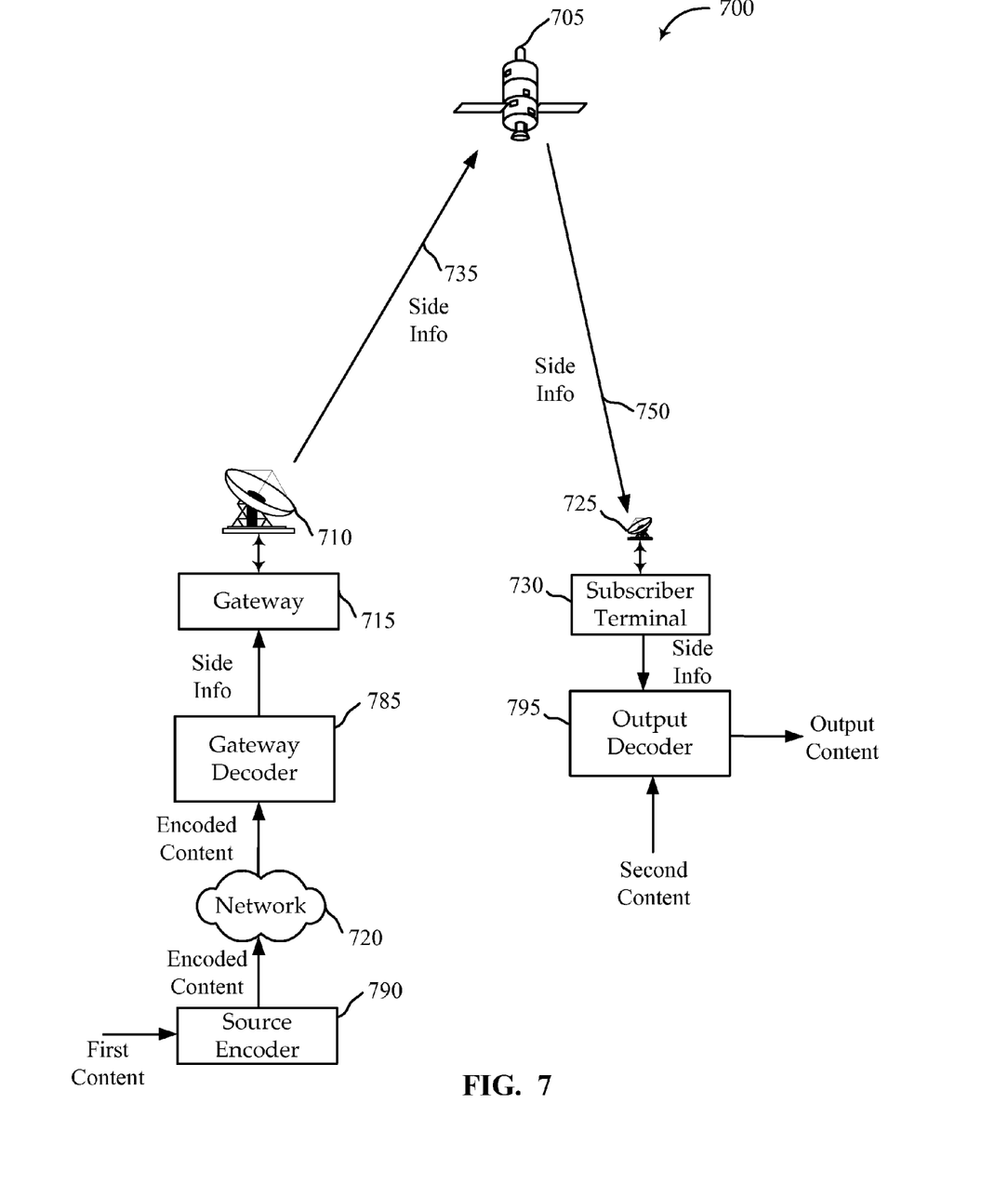
FIG. 7 is a simplified diagram of a satellite communications system configured for forward channel optimization in accordance with another embodiment of the present invention.

FIG. 7 is a simplified diagram of a satellite communications system 700 configured for forward channel optimization in accordance with another embodiment of the present invention. In this example, first content is provided to a source encoder 790. The source encoder 790 generates encoded content that is delivered to a gateway decoder 785 via a network 720. The gateway decoder 785 uses the encoded content to generate side information that is modulated and transmitted by a gateway 715 over satellite links 735, 750 to a subscriber terminal 730. The side information may be used by the subscriber terminal 730 and/or an output decoder 795 to identify second content. For example, the second content may be available from the subscriber terminal 730 or the output decoder 795. Alternatively, the second content may be available from another device that is in communication with the subscriber terminal 730 or the output decoder 795. The second content may be provided to the output decoder 795 to provide output content for an end user. If the second content is encoded, the output decoder 795 may decode the second content. Thus, the output content provided to the end user may be equivalent to or substantially the same as that which would have resulted from transmission of the entire encoded content over the satellite links 735, 750.

Figure 8:
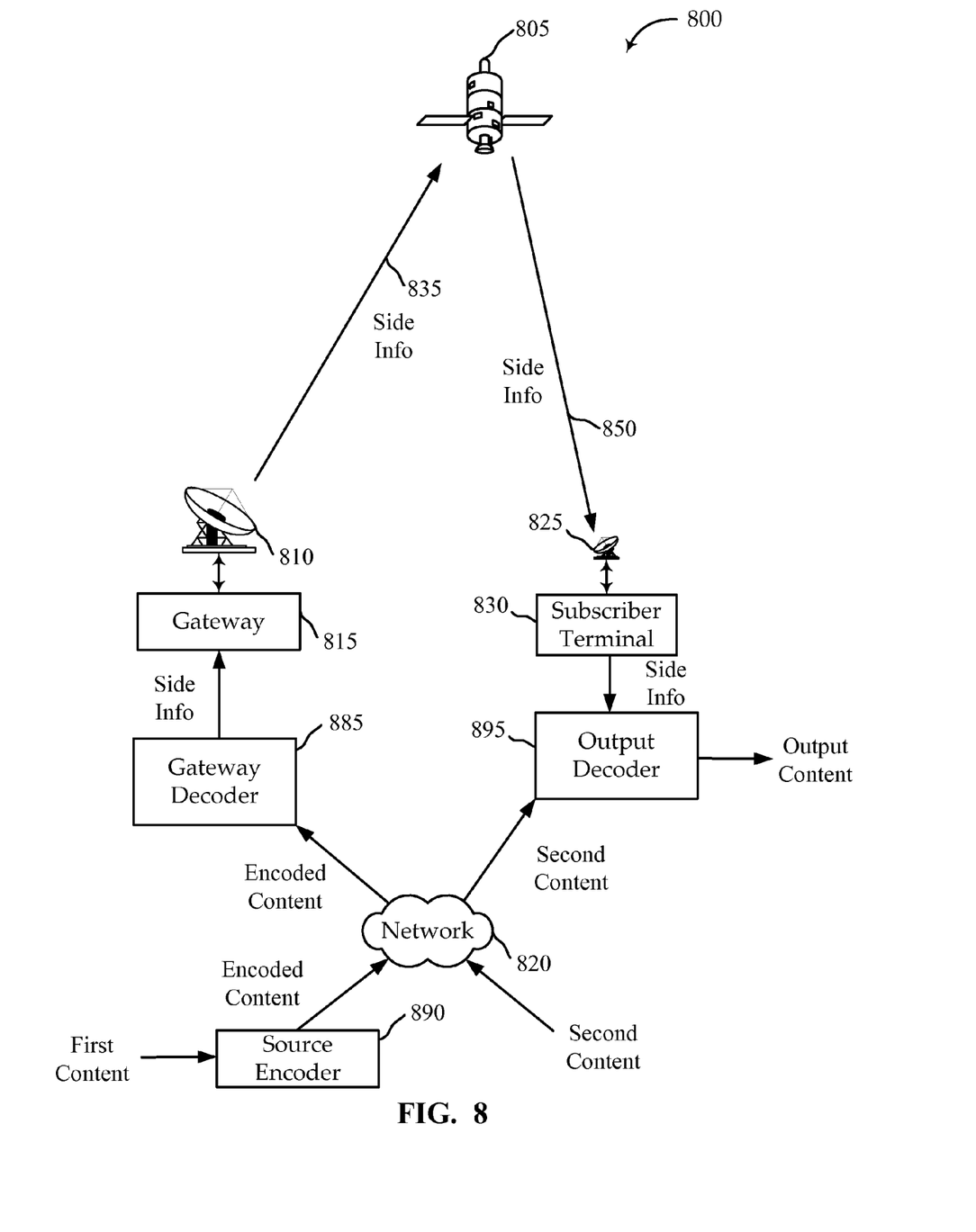
FIG. 8 is a simplified diagram of a satellite communications system configured for forward channel optimization in accordance with another embodiment of the present invention.

FIG. 8 is a simplified diagram of a satellite communications system 800 configured for forward channel optimization in accordance with another embodiment of the present invention. In this example, first content is provided to a source encoder 890. The source encoder 890 generates encoded content that is delivered to a gateway decoder 885 via a network 820. The gateway decoder 885 generates side information that is modulated and transmitted by a gateway 815 over satellite links 835, 850 to a subscriber terminal 830. At the subscriber terminal 830, the side information is used to identify second content. In this example, the second content is available via the network 820. The second content may be provided to the output decoder 895 to provide output content for an end user. If the second content is encoded, the output decoder 895 may decode the second content. Thus, similar to the previous examples, the output content provided to the end user may be equivalent to or substantially the same as that which would have resulted from the transmission of the entire encoded content over the satellite links 835, 850.

Similar to the above examples, some embodiments of the present invention may include identifying encoded content that is transmitted over a satellite link. As an example, digital content in a frame or series of frames may be identified or matched with content in accordance with known techniques. A portion of the encoded content may be used to identify content that is stored at a gateway or subscriber terminal or that is available from a source that is accessible via a computer network. In these embodiments, a portion of the encoded content may be used to identify and/or locate the content, and the content may be provided to an end user without transmitting the entire encoded content over the satellite link.

Figure 9:
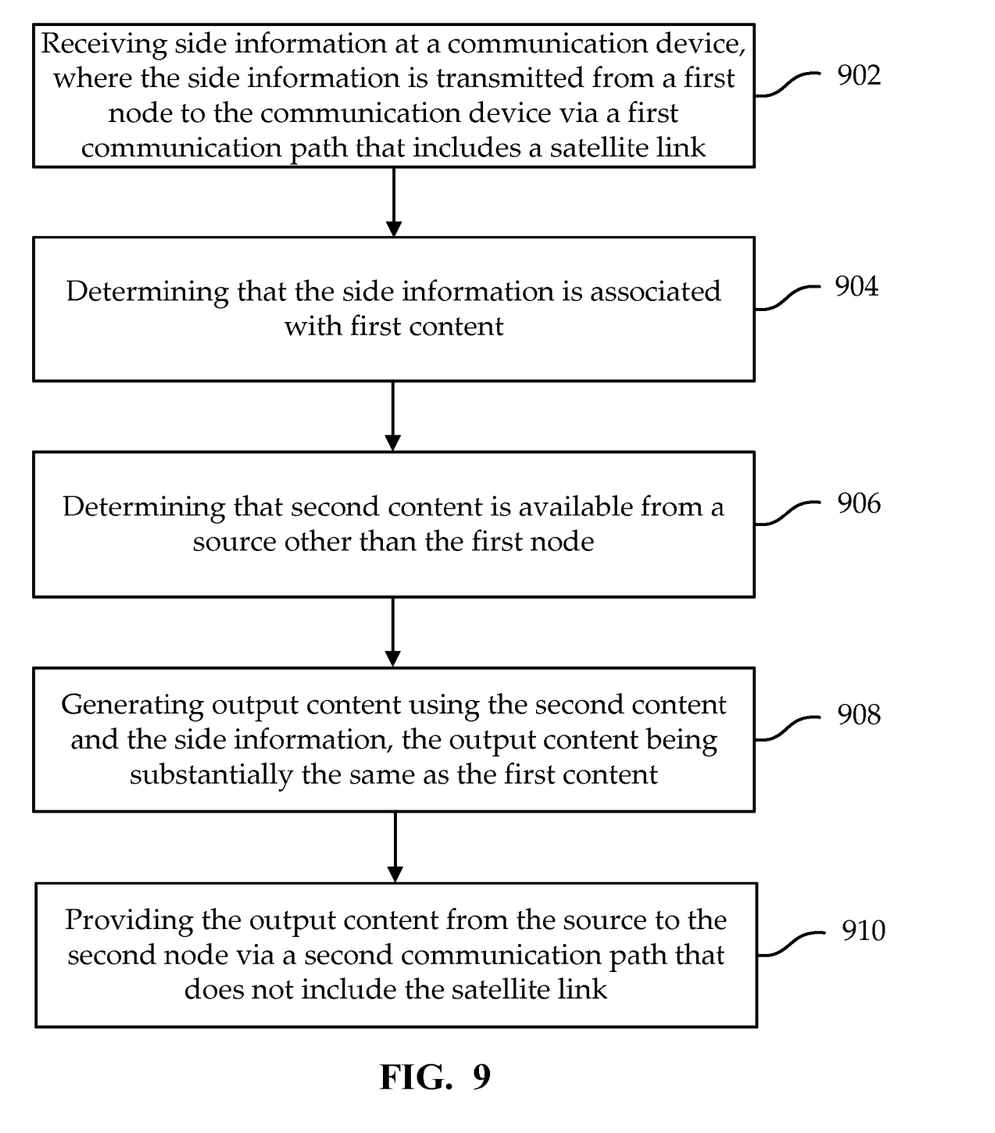
FIG. 9 is a simplified flowchart illustrating an exemplary method for providing content from a first node to a second node using a satellite communications system in accordance with an embodiment of the present invention.

FIG. 9 is a simplified flowchart illustrating an exemplary method for providing content from a first node to a second node using a satellite communications system in accordance with an embodiment of the present invention. The method includes receiving side information at a communication device, where the side information is transmitted from the first node to the communication device via a first communication path that includes a satellite link (902). The communication device may be a gateway, a subscriber terminal, a decoder, an encoder, or the like. The method also includes determining that the side information is associated with first content available at the first node (904). The first content may be source content. The side information may be used, for example, to identify the first content or to generate output content that is substantially the same as the first content. In some embodiments, the side information is generated using the first content.

The method also includes determining that second content is available from a source other than the first node (906). The second content may be a copy of or a similar version of the first, or source, content. The second content may be available at a gateway, a subscriber terminal, or another device in the satellite communications system. Alternatively, the second content may be available from a source that is accessible via a computer network. The method also includes generating output content using the second content and the side information (908). The output content may be substantially the same as the first content. The method also includes providing the output content to the second node via a communication path that does not include the satellite link (910). The output content may be equivalent to or substantially the same as that which would have resulted from the transmission of the first content over the satellite link.

It should be appreciated that the specific steps illustrated in FIG. 9 provide a particular method for providing content from a first node to a second node using a satellite communications system. In some embodiments the steps outlined above may be continuously repeated by system software. Also, other sequences of steps may be performed according to alternative embodiments. For example, the steps outlined above may be performed in a different order. Moreover, the individual steps illustrated in FIG. 9 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 10:
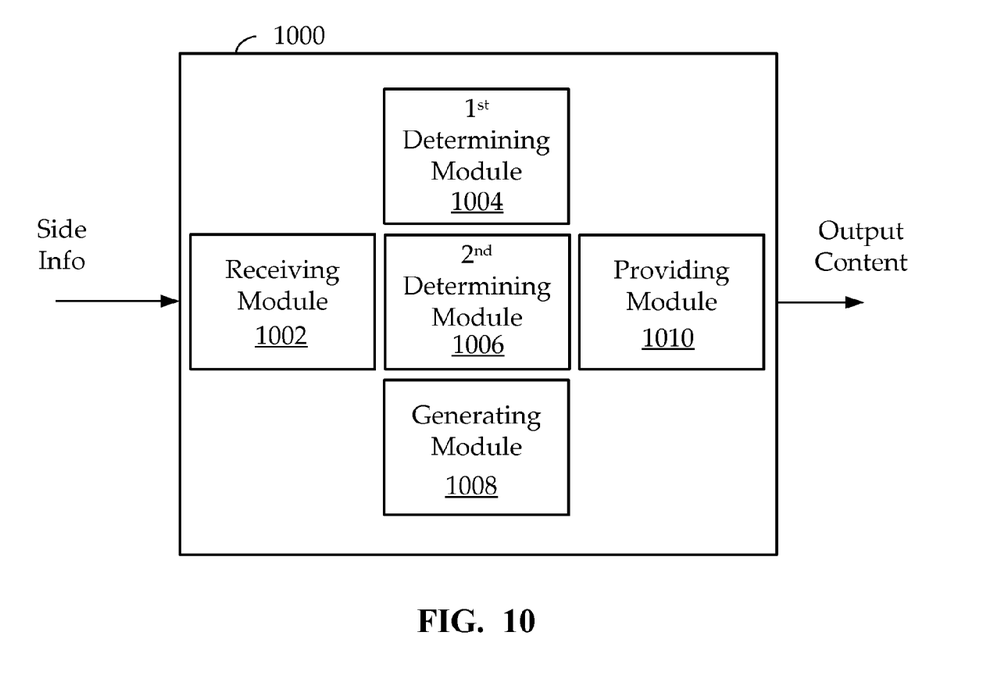
FIG. 10 is a simplified block diagram of an apparatus for providing content from a first node to a second node using a satellite communications system in accordance with an embodiment of the present invention.

FIG. 10 is a simplified block diagram of an apparatus 1000 for providing content from a first node to a second node using a satellite communications system in accordance with various embodiments of the present invention. The apparatus may be, for example, a gateway, a subscriber terminal, or a similar device in a satellite communications system. The apparatus includes a receiving module 1002. The receiving module 1002 may be configured to receive side information transmitted from the first node via a first communications path that includes a satellite link. The apparatus also includes a first determining module 1004. The first determining module 1004 may be configured to determine that the side information is associated with first content available at the first node. The first content may be, for example, source content. The apparatus also includes a second determining module 1006. The second determining module may be configured to determine that second content is available from a source other than the first node. For example, the second content may be a copy of or similar version of the first content. The apparatus also includes a generating module 1008. The generating module 1008 may be configured to generate output content using the second content and the side information. The output content may be substantially the same as the first content. The apparatus also includes a providing module 1010. The providing module 1010 may be configured to provide the output content to the second node via a second communications path that does not include the satellite link.

While a satellite communications system has been used above to illustrate various aspects of the present invention, it should be noted that the principles set forth herein are applicable to a number of other wireless systems as well (e.g., other peer-to-peer wired or wireless links). As an example, side information may be utilized in a cellular communications system in a manner similar to that described above. The side information may be used, for example, to identify content that is being sent, or that is desired to be sent, over a cellular channel. Using the side information, content may be found and obtained from a source that does not require transmission over the cellular channel or that can be transmitted over a lower cost cellular channel. As examples, the content may exist at a cellular gateway or a user device such as a cellular phone. Alternatively, the content may be available from a site that is accessible via a wired or wireless link over a computer network. Obtaining the content from one of these sources, rather than via the cellular channel, can minimize cellular channel utilization and reduce transmission costs. One of ordinary skill in the art would recognize many variations, modifications, and alternatives.

It should be noted that the methods, apparatus, and systems discussed above are provided merely as examples. Various embodiments may omit, substitute, or add various procedures or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks. The term "computer-readable medium" includes, but is not limited to, portable or fixed storage devices, optical storage devices, wireless channels, a sim card, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing content from a first node to a second node using a satellite communications system, the method comprising:

receiving side information at a provider-side gateway in the satellite communications system, the side information being transmitted from a subscriber terminal to the gateway via a first communication path that is a return-channel path that includes a satellite link, the subscriber terminal and the first node being on a first side of the satellite link and the gateway being on a second side of the satellite link;

identifying at the gateway according to the side information that first content is being transmitted from the first node to the second node via the gateway over the satellite link;

determining at the gateway that second content is available from a source other than the first node that is in communication with the second node via a second communication path that does not include the satellite link;

generating output content using the second content and the side information so that the output content is substantially the same as the first content; and providing the output content to the second node via the second communication path.

2. The method of claim 1 wherein providing the output content from the source to the second node comprises:

obtaining at the gateway the second content from the source; and transmitting the output content from the gateway to the second node.

3. The method of claim 1 wherein the first content is streaming media or downloadable media.

4. The method of claim 1 wherein the output content is provided to the second node via a public network.

5. The method of claim 1 wherein the second content is stored at the gateway.

6. The method of claim 1 wherein the source is coupled to the gateway via a computer network.

7. The method of claim 1 wherein the gateway comprises at least one of an encoder or a decoder.

8. The method of claim 1 wherein the second content is substantially the same as the output content.

9. The method of claim 1 wherein the side information comprises rights management information relating to the first content.

10. The method of claim 1 wherein identifying at the gateway according to the side information that the first content is being transmitted from the first node to the second node via the gateway over the satellite link comprises:

receiving a portion of the first content at the gateway; and identifying at the gateway according further to the received portion of the first content that the first content is being transmitted.

11. The method of claim 1 wherein the side information and at least a portion of the first content are communicated over the satellite link as a multiplexed signal.

12. The method of claim 11 wherein receiving the side information at the gateway comprises:

receiving the multiplexed signal at the gateway; and parsing the side information from the multiplexed signal using the gateway.

13. The method of claim 1 further comprising:

in response to the determining step, directing the subscriber terminal not to communicate the first content over the satellite link.

14. The method of claim 1 wherein the side information comprises at least one of: an identifier of the first content, a source identifier for the first content, credentials associated with accessing the first content, a type of encoding associated with the first content, parameters of encoding associated with the first content, encryption information associated with the first content, authentication associated with the first content, rights management associated with the first content, watermarking directions associated with the first content, or timing information associated with the first content.

15. A provider-side gateway for providing content from a first node to a second node using a satellite communications system, comprising:
   a receiving module configured to receive side information transmitted from a subscriber terminal via a first communication path that is a return-channel path that includes a satellite link, the subscriber terminal and the first node being on a first side of the satellite link and the gateway being on a second side of the satellite link;
   an identifying module configured to identify according to the side information that first content is being transmitted from the first node to the second node via the gateway over the satellite link;
   a determining module configured to determine that second content is available from a source other than the first node that is in communication with the second node via a second communication path that does not include the satellite link;
   a generating module configured to generate output content using the second content and the side information so that the output content is substantially the same as the first content; and
   a providing module configured to provide the output content to the second node via the second communication path.

16. The gateway of claim 15 wherein the providing module comprises:
   an obtaining module configured to obtain the second content from the source; and
   a transmitting module configured to transmit the output content to the second node.

17. The gateway of claim 15 wherein the second content is stored at the gateway.

18. The gateway of claim 15 wherein the source is coupled to the gateway via the Internet.

19. A satellite communications system for transmitting content from a first node to a second node, comprising:
   a source encoder configured to receive first content from the first node and generate side information associated with the first content;
   a subscriber terminal configured to transmit the side information via a return-channel satellite link; and
   a provider-side gateway configured to receive the side information via the satellite link and configured to:
      determine, according to the side information, that the first content is being transmitted over the satellite link to the second node;
      determine that second content is available from a source other than the first node that is in communication with the second node via a terrestrial communication path that does not include the satellite link;
      generate output content using the second content and the side information in such a way that the output content is substantially the same as the first content; and
      provide the output content to the second node via the terrestrial communication path.

20. The satellite communications system of claim 19 wherein the second content is stored at the gateway.

21. The satellite communications system of claim 19 wherein the gateway is configured to direct the second node to receive the output content via a computer network that does not include the gateway.

* * * * *